United States Patent [19]

Thomas et al.

[11] 4,045,233

[45] Aug. 30, 1977

[54] REFRACTORY COMPOSITION AND METHOD FOR PREPARATION

[75] Inventors: Everett A. Thomas; Ronald W. Knake, both of Cincinnati, Ohio

[73] Assignee: N L Industries, Inc., New York, N.Y.

[21] Appl. No.: 726,999

[22] Filed: Sept. 27, 1976

Related U.S. Application Data

[63] Continuation-in-part of Ser. No. 639,582, Dec. 10, 1975.

[51] Int. Cl.² ............................................. C04B 35/48
[52] U.S. Cl. .......................................... 106/57; 106/67
[58] Field of Search .................................. 106/57, 67

[56] References Cited

U.S. PATENT DOCUMENTS 3,437,499    4/1969    Horak et al. ................... 106/67

Primary Examiner—J. Poer

[57] ABSTRACT

An improved refractory composition has been prepared which is particularly satisfactory for use in glass furnace applications. The composition comprises the following ingredients:

| | |
|---|---|
| Alumino-Silicate | 45 - 70% |
| Calcined Alumina | 5 - 15% |
| Zircon | 15 - 35% |
| Clay | 1 - 5% |
| Pyrophyllite | 1 - 5% |

10 Claims, No Drawings

4,045,233

REFRACTORY COMPOSITION AND METHOD FOR PREPARATION

This application is a Continuation-In-Part of parent application, Ser. No. 639,582 filed Dec. 10, 1975.

BACKGROUND OF THE INVENTION

Ceramically bonded refractory bodies used as linings in glass melting vessels should be capable of withstanding the severe environmental conditions created during furnace operations. Ideally, the linings of such vessels should be resistant to corrosion, erosion, provide thermal insulation and remain structurally stable over a wide range of temperatures for extended periods.

Refractory compositions based on zirconia, alumina and silica exhibit these characteristics to a great extent. However, such materials have not proved completely adequate in providing resistance to the alkaline vapors and dust present during glass melting. It has been observed that undesirable reactions occur between alkaline vapors, such as may be derived from sodium carbonate or sodium hydroxide, and zirconia-alumina-silica based brick. These deleterious reactions cause shelling, peeling, surface expansion of exposed bricks, contamination of glass batches and early structural failures of refractory linings, particularly in the upper sections of lined vessels where alkaline vapor condensates are formed.

Although bonded refractory compositions containing alumina, zirconia and silica have low apparent porosities, the prior art products undergo disintegration upon contact with the soda or potash vapors due to formation of expanded mineral phases composed of beta alumina and alkaline alumina silicate.

To overcome these disintegration features, the instant invention is directed to lowering the alumina content and to replacing most of the alumina with alumino-silicate materials which contain from 45% to 75% alumina.

SUMMARY OF THE INVENTION

The instant invention provides a new refractory composition comprising 45% to 70% alumino-silicate, 5% to 15% calcined alumina, 15% to 35% zircon, 1% to 5% clay and 1% to 5% pyrophyllite, the alumino-silicate containing from 45% to 75% alumina.

Each of these ingredients are added to the composition in various size ranges in order to provide upon firing a dense product having a low porosity.

DESCRIPTION OF THE PREFERRED EMBODIMENTS

The alumino-silicate material which may be used in the instant invention includes alumino-silicate ores and compositions which contain from 45% to 75% alumina, the remaining portions being various silicate compositions. Among the alumino-silicate materials which are most useful include mullite, sillimanite, synthetic alumina-silica grain containing 45–75% $Al_2O_3$, kyanite, andalusite and the like.

The clay employed should possess a small particle size and have a fairly high surface area. Clays which are particularly satisfactory include ball clay, kaolin and particularly bentonite.

In order to prepare the composition of the instant invention, the above described ingredients are mixed together to form a homogeneous mixture.

The alumino-silicate material should be added over a variety of sizes. At least three quarters of the alumino-silicate added should be $-4+48$ mesh in size while the remainder should be less than 48 mesh.

The calcined alumina should be $-325$ mesh and the pyrophyllite should be $-140$ mesh in size.

In preparing the above composition, all of the ingredients listed above in the specified size ranges are mixed together with from 2% to 5% water to form a homogeneous so-called "dry pressing mix".

This "dry pressing mix" is then added to a die, pressed and then dried and fired to form the refractory body of the instant invention.

In the prior art, refractories containing zirconia, alumina and silica, the tabular alumina employed is bonded by fine mullite crystals interspersed therein. In such a refractory, the alkali vapors attack the tabular alumina and form beta alumina which has a lower density than tabular alumina. The resulting expansion cause flaking and disintegration of the refractory body.

In contrast to the prior art, the instant composition, when fired, produces a product in which the sintered alumino-silicate is bonded by the fine material which forms a siliceous glass containing zirconia and fine crystalline mullite interdispersed therein.

This particular composition, which possesses a high density and low porosity, contains zircon, alumino-silicate grain, calcined alumina, clay and pyrophyllite. The zircon provides the necessary zirconia phase to resist corrosion by alkali vapors and condensates. The finely divided calcined alumina, clay and the pyrophyllite provide the bond phase to give a low apparent porosity. The alumino-silicate provides the coarse phase media necessary for grain size distribution to resist shrinkage during sintering and provide a siliceous phase in service to retard the formation of beta alumina.

In order to describe the instant invention in greater detail the following examples are presented:

EXAMPLE 1

In this example the following ingredients were dry mixed:

| | | | |
|---|---|---|---|
| Synthetic mullite | 500 lbs. | 200 lbs. | $(-4 + 10$ mesh) |
| | | 250 lbs. | $(-10 + 28$ mesh) |
| | | 50 lbs. | $(-28 + 48$ mesh) |
| Synthetic mullite | 125 lbs. | | $(-48$ mesh) |
| Calcined alumina | 100 lbs. | | $(-325$ mesh) |
| | | 150 lbs. | $(-100 + 325$ mesh) |
| Zircon | 250 lbs. | 100 lbs. | $(-325$ mesh) |
| Pyrophyllite | 25 lbs. | | $(-140$ mesh) |
| Bentonite | 40 lbs. | | $(-200$ mesh) |

To this mixture were added 37 lbs. of water and with thorough mixing a homogeneous "dry pressing mix" was obtained. A portion of this mixture was then charged to a die cavity and pressed into bricks $9 \times 4\frac{1}{2} \times 3$ inches. The pressed bricks were then removed from the die and were dried at 200°–300° F.

After drying, the bricks were then fired at 2800° F. for 25 hours to form the refractory bodies. These bricks possessed low porosities and resisted alkali vapor penetration.

EXAMPLES 2–8

Using the procedure described in Example 1, more refractory compositions were prepared in which the amounts of the ingredients employed were varied. All of these refractory products also possessed low porosities and they resisted alkali vapor penetration. They also were substantially free from flaking and deterioration.

The operational details and the results obtained are recorded in the Table along with those of Example 1.

EXAMPLES 9-14

In these examples the procedure of Example 1 was used except that the bentonite was replaced with ball clay and kaolin.

Again, the results are recorded in the Table.

EXAMPLES 15-17

In these examples the synthetic mullite was replaced with various alumino-silicate materials. The runs were all prepared using the same procedure as that described in Example 1.

The results are recorded in Table II.

From the above description and by the examples presented, improved refractory products have been prepared which possess lower porosities than the prior art products.

The substitution of alumino-silicates for part of the alumina used in the prior art prevents the instant product from flaking and deterioration. These improved refractory products which are less porous than the prior art possess more resistance to alkali vapor penetration.

While this invention has been described and illustrated by the examples shown, it is not intended to be strictly limited thereto, and other variations and modifications may be employed within the scope of the following claims.

TABLE I

| Ingredients | Particle Size | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Synthetic Mullite | −4+10 (lbs) | 192 | 240 | 198 | 214 | 200 | 250 | 250 | 250 | 195 | 192 | 189 | 195 | 192 | 189 |
| Synthetic Mullite | −10+28 (lbs) | 240 | 192 | 247 | 310 | 220 | 150 | 170 | 150 | 245 | 240 | 235 | 245 | 240 | 235 |
| Synthetic Mullite | −28+48 (lbs) | 48 | 48 | 48 | 95 | 40 | 50 | 50 | 80 | 49 | 48 | 47 | 49 | 48 | 47 |
| Synthetic Mullite | −48 (lbs) | 120 | — | 145 | 48 | 125 | — | 70 | 80 | 123 | 120 | 118 | 123 | 120 | 118 |
| Calcined Alumina | −325 (lbs) | 96 | 145 | 270 | 95 | 100 | 100 | 100 | 50 | 98 | 96 | 94 | 98 | 96 | 94 |
| Zircon | −100+325 (lbs) | 145 | 270 | 222 | 71 | 100 | — | — | — | 147 | 144 | 142 | 147 | 144 | 142 |
| Zircon | −325 (lbs) | 96 | 67 | 74 | 71 | 150 | 350 | 350 | 350 | 98 | 96 | 94 | 98 | 96 | 94 |
| Pyrophyllite | −140 (lbs) | 25 | 50 | 50 | 48 | 25 | — | — | 10 | 25 | 24 | 24 | 25 | 24 | 24 |
| Bentonite | −200 (lbs) | 38 | 38 | 10 | 48 | 40 | 50 | 50 | 30 | 20 | 40 | 57 | — | — | 57 |
| Ball Clay | (lbs) | — | — | — | — | — | 50 | 10 | — | — | — | — | 20 | — | — |
| Kaolin | (lbs) | — | — | — | — | — | — | — | — | — | — | — | — | — | — |
| Ranges | | | | | | | | | | | | | | | |
| Synthetic Mullite | −4+48 (%) | 48 }60 | 48 }48 | 49.5 }59.4 | 61.9 }66.7 | 46 }58.5 | 45 }49 | 49 }49 | 48 }56 | 48.9 }61.2 | 48 }60 | 47.1 }58.9 | 48.9 }61.2 | 48 }60 | 47.1 }58.9 |
| Synthetic Mullite | −48 (%) | 12 | — | 9.9 | 4.8 | 12.5 | — | — | 8 | 12.3 | 12.0 | 11.8 | 12.3 | 12.0 | 11.8 |
| Calcined Alumina | −10+325 (%) | 9.6 | 14.5 | 9.6 | 9.5 | 9.8 | 9.6 | 9.4 | 5 | 9.8 | 9.6 | 9.4 | 9.8 | 9.6 | 9.4 |
| Zircon | −100+325 (%) | 14.5 }24.1 | 6.7 }33.7 | 22.2 }29.6 | 7.1 }14.2 | 10 }25 | 35 }35 | 35 }35 | — }35 | 14.7 | 14.4 | 14.2 | 14.7 | 14.4 | 14.2 |
| Zircon | −325 (%) | 9.6 | 27 | 7.4 | 7.1 | 15 | — | — | 35 | 9.8 | 9.6 | 9.4 | 9.8 | 9.6 | 9.4 |
| Pyrophyllite | (%) | 2.5 | 3.8 | 5 | 4.8 | 2.5 | 5 | 5 | 1 | 2.5 | 2.4 | 2.4 | 2.5 | 2.4 | 2.4 |
| Bentonite | (%) | 3.8 | — | — | 4.8 | 4 | — | — | 3 | — | — | — | — | — | — |
| Properties | | | | | | | | | | | | | | | |
| Porosity | (%) | 11.9 | 13.0 | 13.1 | 11.4 | 12.4 | 10.2 | 12.7 | — | — | — | — | — | — | — |
| Lbs./Cu. Ft. | | 177.6 | 182.2 | 179.5 | 171.9 | 177.3 | 187.2 | 184.0 | — | — | — | — | — | — | — |

TABLE I-continued

| | | Examples | | | | | |
|---|---|---|---|---|---|---|---|
| Ball Clay | (%) | — | 2 | 4 | 5.7 | — | — | — |
| Kaolin | (%) | — | — | — | — | 2 | 4 | 5.7 |
| Properties | | | | | | | | |
| Porosity | (%) | 13.8 | 14.5 | 13.7 | 12.0 | 15.0 | 14.3 | 13.4 |
| Lbs./Cu. Ft. | | 181.2 | 174.9 | 176.2 | 178.2 | 173.7 | 175.8 | 177.0 |

Table II

| Material | Mesh | Examples 15 | 16 | 17 |
| --- | --- | --- | --- | --- |
| Calcined Kyanite | −4+10 | 200 | — | — |
| Calcined Kyanite | −10+28 | 250 | — | — |
| Calcined Kyanite | −28+48 | 50 | — | — |
| Calcined Kyanite | −48 | 125 | — | — |
| 60% Alumina | −4+10 | — | 200 | — |
| 60% Alumina | −10+28 | — | 250 | — |
| 60% Alumina | −28+48 | — | 50 | — |
| 60% Alumina | −48 | — | 125 | — |
| Andalusite | −4+10 | — | — | 200 |
| Andalusite | −10+28 | — | — | 250 |
| Andalusite | −28+48 | — | — | 50 |
| Andalusite | −48 | — | — | 125 |
| Calcined Alumina | −325 | 100 | 100 | 100 |
| Zircon | −100+325 | 150 | 150 | 150 |
| Zircon | −325 | 100 | 100 | 100 |
| Pyrophyllite | −140 | 25 | 25 | 25 |
| Bentonite | −200 | 40 | 40 | 40 |
| Properties | | | | |
| Apparent Porosity, % | | 13 − 15 | 11 − 12 | 8.5 − 9.5 |
| Bulk Density, lbs./cu.ft. | | 175 | 179 | 183 |

We claim:

1. A refractory composition comprising from 45% to 70% alumino-silicate, from 5% to 15% calcined alumina, from 15% to 35% zircon, from 1% to 5% clay and from 1% to 5% pyrophyllite, said alumino-silicate containing from 45% to 75% alumina.

2. Composition according to claim 1 in which the alumino-silicate present is synthetic mullite.

3. Composition according to claim 1 in which the clay present is bentonite.

4. A method for preparing a refractory body which comprises forming a mixture containing from 45% to 70% alumino-silicate from 5% to 15% calcined alumina, from 15% to 35% zircon, from 1% to 5% clay and from 1% to 5% pyrophyllite, pressing said mixture in a die and firing the mixture to form the refractory body, said alumino-silicate containing from 45% to 75% alumina.

5. Method according to claim 4 in which the alumino-silicate employed is synthetic mullite.

6. Method according to claim 4 in which the clay employed is bentonite.

7. Method according to claim 4 in which from 2% to 5% water is added to the mixture to form a homogeneous dry pressing mix, the pressing mix pressed into a die and then dried before being fired to form the refractory body.

8. Method according to claim 4 in which the alumino-silicate employed is synthetic mullite and in which three-fourths of the synthetic mullite employed falls within the size range from −4 + 48 mesh, the remaining one-fourth being less than 48 mesh in size.

9. Method according to claim 4 in which the calcined alumina is less than 325 mesh in size.

10. Method according to claim 4 in which the clay employed is bentonite and wherein both the bentonite and the pyrophyllite are less than 140 mesh in size.

* * * * *